Patented July 8, 1952

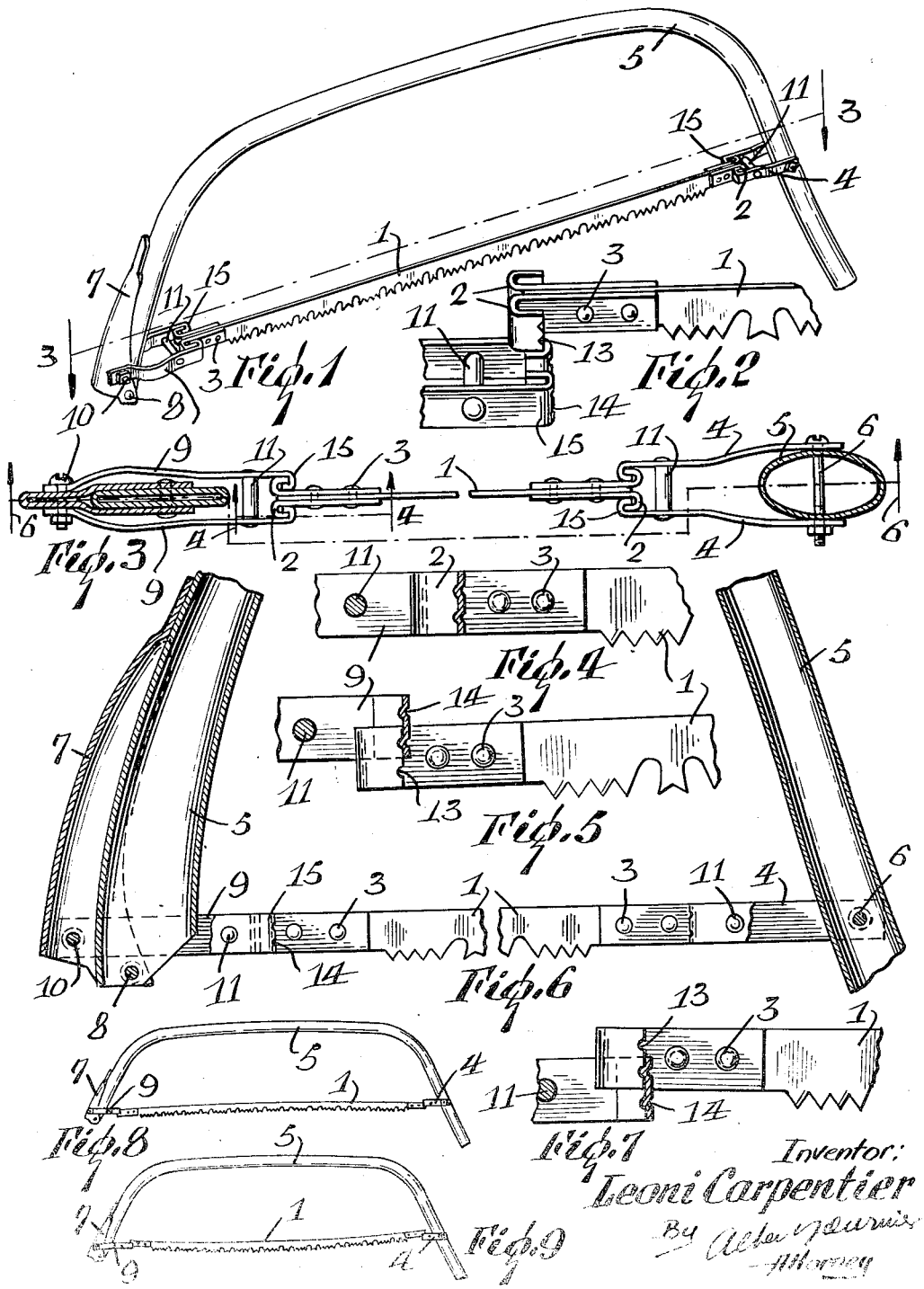

2,602,478

UNITED STATES PATENT OFFICE 2,602,478

BUCK SAW

Léoni Carpentier, Rosemont, Montreal, Quebec, Canada

Application May 5, 1950, Serial No. 160,152

4 Claims. (Cl. 145—33)

The present invention pertains to a novel buck saw for use in lumbering and similar sawing operations.

The principal object of the invention is to provide a saw of this character wherein it is possible to vary the spacing between the saw teeth by an adjustment of the saw blade in its frame. Such variations in the spacing of the saw teeth are specially suited to varying conditions of work governed by the nature of the wood, the temperature, humidity etc. An experienced lumberman knows the character of saw blade best suited for a given condition, and it is of great value to him to be able to adjust the tooth spacing.

A further object of the invention is to provide such a saw providing the described adjustability and at the same time no more complex nor expensive than a conventional buck saw.

In the accomplishment of these objects, the saw includes the usual bow frame and pivoted tension lever at one end. The saw blade is to be secured between the lever and the opposite end of the frame. The attachment is made by means of interlocking hooked members at the respective parts.

These members have a substantial dimension in the direction transverse of the blade. Also, they have interlocking elements along this dimension. Thus, the blade is adjustable transversely in the adjacent hooked members. If locked nearer its toothed edge, the saw blade will arch outwardly of the frame and spread the saw teeth farther apart. Conversely, if locked at the untoothed edge, the blade will arch inwardly and bring the teeth closer together. Various adjustments between the limits are available.

The invention is fully disclosed by way of example in the following description and in the accompanying drawings in which:

Figure 1 is a perspective view of the device;

Figure 2 is a detail perspective view;

Figure 3 is a section on the line 3—3 of Figure 1;

Figure 4 is a section on the line 4—4 of Figure 3;

Figure 5 is a similar view showing a different adjustment;

Figure 6 is a section on the line 6—6 of Figure 3;

Figure 7 is a detail showing still another adjustment;

Figure 8 is an elevation corresponding to Figure 5, and

Figure 9 is an elevation corresponding to Figure 7.

Reference to these views will now be made by use of like characters which are employed to designate corresponding parts throughout.

In Figure 1 is shown the blade 1 of a buck saw. To each end thereof, at both surfaces, is attached a pair of hooks 2 by rivets 3, the hooks facing toward the opposite end of the blade, for attachment to the saw frame as will presently be shown.

Hooked straps 4 are interlocked with the hooks 2 at one end and fastened to the corresponding end of the bowed frame 5 by a bolt 6, as shown in Figure 3. To the other end of the frame is attached a tightening lever 7 by a pivot pin 8. The hooks 2 at this end are interlocked with hooked straps 9 which in turn, are attached to the lever 7 by a bolt 10. Each pair of straps 4 and 9 is joined by a rivet 11 near the hooked end, so that the straps will not spread apart.

The extremities of the hooks 2 are notched at 13 in a vertical series to interlock with apertures 14 in the bends of the hooks 15 of the straps 4, 9. Thus, the ends of the saw blade may be offset vertically from the hooks 2, upward or downward, as shown in detail in Figures 2 and 5 and again in Figures 8 and 9.

In the use of the device, the tension produced by the lever 7 holds the hooks 2 in firm engagement with the hooked straps 4 and 9 and holds the saw blade under tension. When the members 2 are fully alined with the members 4 and 9, as in Figure 4, the blade lies straight as shown in Figure 1.

However, if the blade is dropped as in Figures 5 and 8, the blade arches upward because of the greater tension along its upper edge. Again, if the blade is raised relatively to the members 4 and 9, as in Figures 7 and 9, the blade arches upwardly because of the greater tension along its lower edge. In the first case the saw teeth are brought closer together, and in the second case they are spread from their normal condition. These variations in the spacing of the saw teeth render the saw blade suitable for various conditions of cutting, such as the nature of the wood and the temperature.

Lumbermen know which type of blade is better suited for the conditions at hand and can make the adjustment accordingly, at any selected position at or between the limit positions.

Although a specific embodiment of the invention has been illustrated and described, it will be understood that various alterations in the details of construction may be made without departing from the scope of the invention as indicated by the appended claims.

What I claim is:

1. In a buck saw, a frame, a pair of spaced hook members at each end thereof, a saw blade, a pair of hook members on each end thereof and engageable with the first named members respectively, said members having a substantial dimension in a direction parallel to the width of the blade, the members on said blade being slidable on the members on said frame in said direction, of the blade, and equally spaced interlocking elements in said members along said dimension, whereby said blade may be adjusted in the first named members along said dimension.

2. In a buck saw, a frame, a pair of spaced hook members at each end thereof, a saw blade, a pair of hook members on each end thereof and engageable with the first named members respectively, said members having a substantial dimension in a direction parallel to the width of the blade, the members on said blade being slidable on the members on said frame in said direction, of the blade, spaced notches formed in one of said groups of members, and projections on the other group, spaced equally to and adapted to enter said notches, whereby said blade may be adjusted in the first named members along said dimension.

3. In a buck saw, a frame, a tension lever pivoted on one end thereof, a pair of spaced hook members on said lever and on the other end of said frame, a saw blade, a pair of hook members on each end thereof and engageable with the first named members respectively, said members having a substantial dimension in a direction parallel to the width of the blade, the members on said blade being slidable on the members on said frame in said direction, of the blade, and equally spaced interlocking elements in said members along said dimension, whereby said blade may be adjusted in the first named members along said dimension.

4. In a buck saw, a frame, a tension lever pivoted on one end thereof, a pair of spaced hook members on said lever and on the other end of said frame, a saw blade, a pair of hook members on each end thereof and engageable with the first named members respectively, said members having a substantial dimension in a direction parallel to the width of the blade, the members on said blade being slidable on the members on said frame in said direction, of the blade, spaced notches formed in one of said groups of members, and projections of the other group, spaced equally to and adapted to enter said notches, whereby said blade may be adjusted in the first named members along said dimension.

LÉONI CARPENTIER.

REFERENCES CITED

The following references are of record in the file of this patent:

UNITED STATES PATENTS

| Number | Name | Date |
|---|---|---|
| 1,063,828 | Murchey | June 3, 1913 |
| 1,484,168 | Bertas et al. | Feb. 19, 1924 |
| 1,882,328 | Kinkel | Oct. 11, 1932 |